US006975240B1

(12) United States Patent
Deacon

(10) Patent No.: US 6,975,240 B1
(45) Date of Patent: Dec. 13, 2005

(54) ELECTRONIC ALERT RESPONSE SYSTEM

(76) Inventor: Melissa M. Deacon, 7417 Dover La., Parma, OH (US) 44130

( * ) Notice: Subject to any disclaimer, the term of this patent is extended or adjusted under 35 U.S.C. 154(b) by 0 days.

(21) Appl. No.: 10/368,116

(22) Filed: Feb. 18, 2003

(51) Int. Cl.[7] .................... H04B 3/36
(52) U.S. Cl. .............. 340/692; 340/407.1; 340/825.19
(58) Field of Search .................... 340/692, 311.2, 340/407.1, 407.2, 825.19; 379/88.13, 88.14, 379/418; 455/567

(56) References Cited

U.S. PATENT DOCUMENTS 4,853,674 A * 8/1989 Kiss .................... 340/407.1
6,118,979 A 9/2000 Powell .................... 340/7.6
6,263,218 B1 * 7/2001 Kita .................... 455/567
6,359,550 B1 3/2002 Brisebois et al. ........ 340/407.1
6,424,251 B1 7/2002 Byrne .................... 340/7.58
6,463,131 B1 10/2002 French-St. George et al. ... 379/88.23

FOREIGN PATENT DOCUMENTS

GB 2221070 A * 1/1990 ............ G08B 3/00

* cited by examiner

*Primary Examiner*—Jeffery Hofsass
*Assistant Examiner*—Jennifer Stone
(74) *Attorney, Agent, or Firm*—Forrest L. Collins Law Offices, LLC; Forrest L. Collins

(57) ABSTRACT

The present invention deals with a plurality of transceivers which are programmable. The plurality of transceivers functions to permit, for example, a hearing impaired individual or a visually impaired individual to receive communications which indicate the source of the communication through the programming of one or more of the transceivers.

9 Claims, 1 Drawing Sheet

ELECTRONIC ALERT RESPONSE SYSTEM

BACKGROUND OF THE INVENTION

1. Field of the Invention

The present invention relates to devices which aid differently abled individuals such as those that are hearing-impaired or visually impaired to receive communications.

2. Description of the Art Practices

U.S. Pat. No. 6,359,550 to Brisebois, et al. Mar. 19, 2002 discusses an array of stimulators associated with a personal communications device for providing the user with tactile messaging respecting call processing or call network status. The array is positioned on the device so as to be in contact with the user while the terminal is carried or worn, on a wrist, for example. The stimulators of the array are activated independently so as to provide the user with an encoded message of call processes such as alerting, dial tone, busy signal, etc. Preferably each status is associated with one of a set of unique patterns of operation of the stimulators recognizable by the user as tactile image or pattern of operation, rather than necessitating tactile sensation of individual sequences of each stimulator. Advantageously audio and haptic signaling is synchronized to provide a tactile warning to alert user to impending audio signal, and thereby allow a lower level, i.e. quieter, audio signal to be used, because the user is primed by the tactile signal to expect the audio signaling. Thus the audio threshold for effective signaling is reduced and obtrusiveness of audio signaling in public places may be reduced when used in combination with tactile messaging.

U.S. Pat. No. 6,236,319 issued May 22, 2001 to Pitzer, et al. describes a body worn transmitter periodically transmits a coded RF signal from a rolling code generator, which is received by a base unit at the location where a person is confined, which base unit has a rolling code generator synchronized to produce the same random code signal for comparison. If proper coded signals are not received, a report is sent via telephone to a remote monitoring station. The body worn transmitter is designed to detect and defeat attempts at removal. The body worn transmitter is also used to detect the presence of a person at a particular location. By programming the time of RF transmissions, a large number of body worn transmitters can be monitored at a given location.

Kanor, et al. in U.S. Pat. No. 6,384,728 issued May 7, 2002 relates to a personal care monitoring system having at least one condition detecting sensor and a corresponding condition indicator. The condition detecting sensor may indicate detection of wetness, such as caused by enuresis. Alternatively, or additionally, the condition detecting sensor may indicate that the physical position of the wearer of the device has not been adjusted for over a predetermined amount of time after which the likelihood of the development of bedsores increases. The indicator may be any desired type of indicator, preferably alerting one of the senses that the monitored condition has been detected. For instance, the indicator may be a light, an audible alarm, or a vibrating device. A processing means preferably is provided to control operation of the various components of the monitoring system. Moreover, the processing means may be programmed to store information pertaining to the operation of the components of the monitoring system. For example, the time at which a condition has been detected as well as the time at which a care giver has attended to the condition may be recorded. Such information may be retrieved to determine the frequency of care given to the wearer of the monitoring system as well as the amount of time elapsed between occurrence of the monitored condition and attendance to such condition by the care giver.

Powell in U.S. Pat. No. 6,118,979 issued Sep. 12, 2000 suggests a method of communicating an incoming call through a telephone receiver having an incoming call circuit and an audible signal system operatively connected to the circuit. The incoming call is communicated to a person remotely located from the receiver. The method comprises disconnecting the audible signal system, and placing on the person a pager having a receiver circuit capable of sensing the existence of an incoming call destined for the incoming call circuit of the telephone receiver. The pager having a silent announcer thereon operatively connected to the receiver circuit of the pager. Thus, the presence of an incoming call can be transmitted to the receiver circuit of the pager to actuate the vibrator without actuating the audible signal system of the telephone receiver.

French-St. George, et al. in U.S. Pat. No. 6,463,131 Oct. 8, 2002 relates to a system and method for providing multisensory signaling capabilities enables a user to manage the receipt of incoming communication events, after an initial notification sequence, using multiple media options. Specifically, a remote device notifies a user of incoming communication events and offers real-time coupling of the notifications with communication management options. The message is delivered or otherwise processed according to the option selected.

U.S. Pat. No. 6,424,251 which issued to Byrne Jul. 23, 2002 describes systems and methods for alerting users of personal electronic devices. In a first aspect these systems and methods alert a user to the occurrence of an event in one or more of the devices by receiving a wireless transmission from the device(s) and then by providing an acoustic, optical, electrical, or mechanical stimulus to the user. In a second aspect these systems and methods may also provide a quiet mode control mechanism through which personal electronic devices are automatically put into a low volume or silent alert operation mode so as not to disturb persons in the vicinity of the devices. This control mechanism may use a wireless transmitter to transmit a signal to any personal electronic device within a given area.

U.S. Pat. No. 6,377,823 issued to Higuchi, et al. Apr. 23, 2002 suggests a cellular mobile telephone apparatus including a main body, and an alarm device which is provided separately from the main body, the main body including: receiving/transmitting unit for receiving and transmitting radio frequency signals between a base station; modulating/demodulating unit for modulating and demodulating between the radio frequency signals, and a conversation signal and a control signal; telephone receiver unit for reproducing audible conversation voice in response to the demodulated conversation signal from the modulating/demodulating unit; telephone transmitting unit for converting conversation voice into the conversation signal; a controller for controlling operation of the main body of the cellular mobile telephone apparatus in accordance with the control signal; and an alarm device for providing an alarm signal which includes an identification information and is transmitted through the radio frequency, when a call is terminated at the main body; and the alarm device including: receiving unit for receiving the alarm signal of radio frequency; a discriminatory for discriminating the alarm signal assigned to itself from others by the identification information included therein; and an alarm unit for alarming call termination in response to the identification by the discriminator.

Adler in U.S. Pat. No. 6,424,252 issued Jul. 23, 2002 relates to a paging system for washers and dryers including a transmitter adapted for coupling with a washer and dryer. The transmitter can detect an end of a cycle of the washer and dryer. The transmitter includes a plurality of function buttons. A receiver is provided that is adapted for being worn by the person. The receiver is in communication with the transmitter whereupon the transmitter detecting the end of the cycle, the receiver will be sent a signal. The receiver includes an alarm that is activated upon receiving the signal. The receiver includes a plurality of function buttons.

Burnette in U.S. Pat. No. 6,299,345 Oct. 9, 2001 describes providing a chess player with a pager so that the chess player can leave the chess board and still be notified when it is time for the chess player to make his move. A conventional chess timer has a switch to indicate when an opponent has made a move. The device of Burnette is stated to activate a radio frequency transmitter by the switch to send a signal to a pager tuned to receive the signal sent by the transmitter. When the pager receives the radio frequency signal, the receiver generates a vibration and/or turns on a light, and/or less preferably generates a sound whereby a player can be notified at a remote location that an opponent has made his move.

U.S. Pat. No. 6,150,927 issued to Nesbitt Nov. 21, 2000 discusses an anti-vandalism detection and alarm system is disclosed for detecting and reporting the scratching of relatively hard materials such as glass and plastic which generate characteristic sound or vibration frequencies during scratching, and for detecting and reporting the cutting and slashing of relatively soft materials such as fabric, leather and plastic.

U.S. Pat. No. 6,064,309 dated May 16, 2000 and issued Sellers, et al. describes a swimming pool drowning prevention safety system. The swimming pool drowning prevention safety system comprises: an article wearable by a person, a radio frequency transmitting device coupled to the article for transmitting a radio frequency signal, a microprocessor controlled radio frequency receiving station for receiving the radio frequency signal from the radio frequency transmitting device when the radio frequency transmitting device is within a user adjustable radio reception range of the radio frequency receiving station, and an alert signaling device coupled to the radio frequency receiving station for signaling when the person wearing the article has come within the user adjustable radio reception range of the radio frequency receiving station. The swimming pool drowning prevention safety system is further comprised of an adjustable gain control for varying the RF sensitivity of the radio frequency receiving station, and an RF sensitivity trigger circuit coupled to an audio messaging system for broadcasting at least one selected alert message. The swimming pool drowning prevention safety system further comprises telephone circuitry connection equipment for automatically connecting to a telephone system and transmitting the selected alert message. The swimming pool drowning prevention safety system further comprises a microprocessor that controls and integrates operation of the radio frequency receiving station.

To the extent that the foregoing patents are relevant to the present invention they are herein incorporated by reference.

SUMMARY OF THE INVENTION

The present invention describes a system to aid in communicating with the hearing impaired comprising:

- a first transceiver capable of being trained to recognize a first audible event;
- the said first transceiver having means to convert such first audible event to a radio frequency signal;
- a second transceiver capable of being trained to recognize a second different audible event;
- the said second transceiver having means to convert such second different audible event to a second radio frequency signal;
- a third transceiver capable of radio frequency communication with the said first transceiver and the said second transceiver;
- the said third transceiver having haptic means to alert an individual in close proximity to the said third transceiver that a message corresponding to the first audible event has occurred because of receipt of the first radio frequency signal by the said third transceiver or that the second different audible event has occurred because of receipt of the second radio frequency signal by the said third transceiver;
- the said third transceiver having means to visually communicate a message corresponding to the detection of the first audible event or the different second audible event when the said third transceiver has received by the said third transceiver from at least one of the said first transceiver or the said second transceiver.

Yet another aspect of the invention is a system to aid in communicating with an impaired person comprising:

- a first transceiver capable of being trained to recognize a first audible event;
- the said first transceiver having means to convert such first audible event to a radio frequency signal;
- a second transceiver capable of being trained to recognize a second different audible event;
- the said second transceiver having means to convert such second different audible event to a second radio frequency signal;
- a third transceiver capable of radio frequency communication with the said first transceiver and the said second transceiver;
- the said third transceiver having haptic means to alert an individual in close proximity to the said third transceiver that a message corresponding to the first audible event has occurred because of receipt of the first radio frequency signal by the said third transceiver or that the second different audible event has occurred because of receipt of the second radio frequency signal by the said third transceiver;
- the said third transceiver having means to audibly communicate a message corresponding to the detection of the first audible event or the different second audible event when the said third transceiver has received by the said third transceiver from at least one of the said first transceiver or the said second transceiver.

The present invention describes a method to aid in communicating with an impaired person comprising obtaining:

- a first transceiver capable of being trained to recognize a first audible event;
- the said first transceiver having means to convert such first audible event to a radio frequency signal;
- a second transceiver capable of being trained to recognize a second different audible event;
- the said second transceiver having means to convert such second different audible event to a second radio frequency signal;

- a third transceiver capable of radio frequency communication with the said first transceiver and the said second transceiver;
- the said third transceiver having haptic means to alert an individual in close proximity to the said third transceiver that a message corresponding to the first audible event has occurred because of receipt of the first radio frequency signal by the said third transceiver or that the second different audible event has occurred because of receipt of the second radio frequency signal by the said third transceiver;
- the said third transceiver having means to communicate a message corresponding to the detection of the first audible event or the different second audible event when said third transceiver has received by said third transceiver from at least one of said first transceiver or said second transceiver.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

Figure 1:
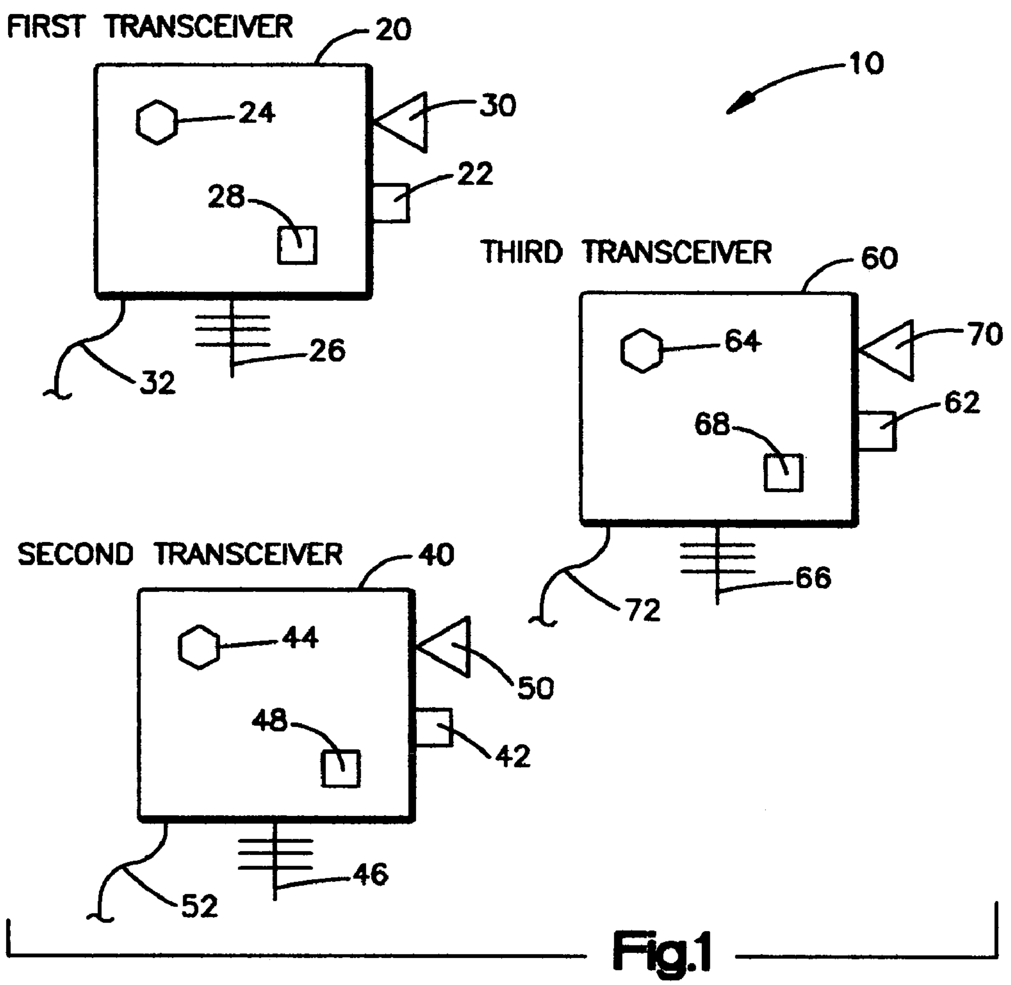
FIG. 1 is a schematic diagram according to the present invention.

As best seen in FIG. 1, is an system 10 for communicating with the hearing impaired, visually impaired, or otherwise physically impaired individual such as in a wheel chair. The first aspect of the present invention is a first transceiver 20. The first transceiver 20 employs a first transceiver microphone 22 for receiving audible signals.

The first transceiver 20 further employs a first computer chip or circuit 24. The first computer chip or circuit 24 is capable of receiving an audible impulse. The audible impulse is convertible by the first computer chip or circuit 24 into an electrical signal which in turn is convertible to radio frequency (RF) signal.

The first transceiver 20 utilizes a first antenna 26 for the output of the radio frequency (RF) signal. The first transceiver 20 also employs a first visual display 28. The first transceiver 20 further comprises a first speaker 30.

The first transceiver 20 is powered by a power source 32. The power source 32 is conveniently 110 volts alternating current converted by a power converter (not shown) to 12 volts direct current to power the first transceiver microphone 22, the first computer chip or circuit 24, the first visual display 28, and the first speaker 30. The power source 32 may also employ a battery having direct current to power the first transceiver microphone 22, the first computer chip or circuit 24, the first visual display 28, and the first speaker 30. Alternatively, the power source 32 for the first transceiver 20 may be a combination of 110 volts alternating current converted by a power converter to 12 volts direct current to power the first transceiver microphone 22, the first computer chip or circuit 24, the first visual display 28, and the first speaker 30.

The second transceiver 40 further employs a second computer chip or circuit 44. The second computer chip or circuit 44 is capable of receiving an audible impulse. The audible impulse is convertible by the second computer chip or circuit 44 into an electrical signal which in turn is convertible to radio frequency (RF) signal.

Figure 2:
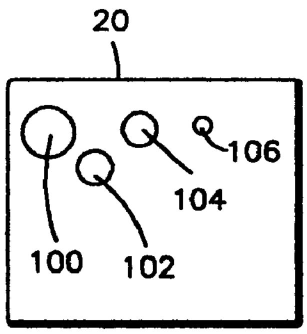
FIG. 2 is a view according to the schematic of FIG. 1.

As best seen in FIG. 2 the first transceiver 20 has a learning switch 100. The learning switch 100 has an on mode 102, an off mode 104, and a reset mode 106. In the on mode 102 the learning switch 100 is capable of transmitting an electrical current. In the off mode 104 the learning switch 100 will not transmit an electrical current. In the reset mode 106 the learning switch 100 is set for reprogramming the system for communicating to the hearing or visually impaired.

The second transceiver 40 utilizes a second antenna 46 for the output of the radio frequency (RF) signal. The second transceiver 40 and also employs a second visual display 48. The second transceiver 40 and further comprises a second speaker 50.

The second transceiver 40 is powered by a power source 52. The power source 52 is conveniently 110 volts alternating current converted by a power converter (not shown) to 12 volts direct current to power the second transceiver microphone 42, the second computer chip or circuit 44, the second visual display 48, and the second speaker 50. The power source 52 may also employ a battery having direct current to power the second transceiver microphone 42, the second computer chip or circuit 44, the second visual display 48, and the second speaker 50. Alternatively, the power source 52 for the second transceiver 50 may be a combination of 110 volts alternating current converted by a power converter to 12 volts direct current to power the second transceiver microphone 42, the second computer chip or circuit 44, the second visual display 48, and the second speaker 50.

Figure 3:
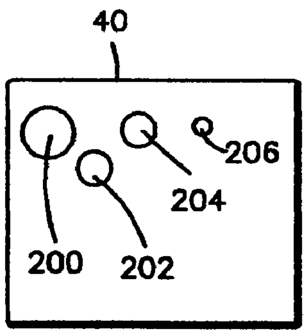
FIG. 3 is a second view according to the schematic of FIG. 1.

As best seen in FIG. 3 the second transceiver 40 has a second learning switch 200. The second learning switch 200 has an on mode 202, an off mode 204, and a reset mode 206. In the on mode 202 the second learning switch 200 is capable of transmitting an electrical current. In the off mode 204 the second learning switch 200 will not transmit an electrical current. In the reset mode 206 the second learning switch 200 is set for reprogramming the system for communicating to the hearing or visually impaired.

The third transceiver 60 further employs a third computer chip or circuit 64. The third computer chip or circuit 64 is capable of receiving an audible impulse. The audible impulse is convertible by the third computer chip or circuit 64 into an electrical signal which in turn is convertible to a radio frequency (RF) signal.

The third transceiver 60 utilizes a third antenna 66 for the output of the radio frequency (RF) signal. The third transceiver 60 also employs a third visual display 68. The third transceiver 60 further comprises a third speaker 70.

The third transceiver 60 is powered by a power source 72. The power source 72 is conveniently 110 volts alternating current converted by a power converter (not shown) to 12 volts direct current to power the third transceiver microphone 62, the third computer chip or circuit 64, the third visual display 68, and the third speaker 70. The power source 72 may also employ a battery having direct current to power the third transceiver microphone 62, the third computer chip or circuit 64, the third visual display 68, and the third speaker 70. Alternatively, the power source 72 for the third transceiver 60 may be a combination of 110 volts alternating current converted by a power converter to 12 volts direct current to power the third transceiver microphone 62, the third computer chip or circuit 64, the third visual display 68, and the third speaker 70.

Figure 4:
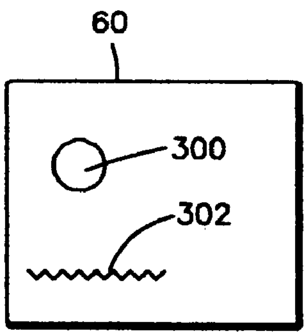
FIG. 4 is a second view according to the schematic of FIG. 1.

As best seen in FIG. 4 the third transceiver 60 has an on off switch 300. The on off switch 300 is employed to operate the third microphone 62 of the third transceiver 60. A haptic mechanism is shown as 302 in FIG. 4. The haptic mechanism is conveniently mounted in a pager or is wrist mounted, as in a wrist watch, to alert the hearing or visually impaired person of a communication from the first transceiver 20 or the second transceiver 40.

In operation, the system for communicating with the hearing or visually impaired permits a differently abled person to receive communications which would otherwise be impossible or difficult to obtain.

When it is desired to obtain the operation of the system for communicating with the hearing or visually impaired the first transceiver 20 is placed in close proximity to the source of a sound to be generated. For example, the first transceiver 20 may be placed near a first telephone (not shown). The first transceiver 20 is then activated by turning the learning switch 100 to the on mode 102.

With the learning switch 100 in the on mode 102 the first telephone is activated in proximity to the first transceiver microphone 22 of the first transceiver 20. It is best that the first transceiver 20 and the first telephone are in a normally quiet area to avoid extraneous sounds.

The first transceiver 20, after receiving the desired sound generated by the first telephone, is thus programmed to recognize the sound (ringing) corresponding to the first telephone. The first transceiver 20 then has the learning switch 100 placed in the off mode 104. In the off mode 104 the first transceiver 20 is capable as later discussed of transmitting the sound learned in this operation. If the first transceiver 20 does not adequately function then the first transceiver 20 may have the reset mode 106 activated to remove the prior learned sound. The first transceiver 20 may then be reprogrammed for the desired sound as discussed above.

The second transceiver 40 is programmed has described above to learn a second sound such as a second telephone. The device which generates the sound may be a doorbell, a washer or dryer, a burglar alarm, a child crying, or the like. In practice, there is no limit to the number of transceivers employed in the present invention. For illustrative purposes only, this application discusses the use of a first transceiver 20 and a second transceiver 40.

The sound received by the first transceiver 20 is converted by the first computer chip or circuit 24 into a radio frequency signal. The radio frequency signal is broadcast by the first antenna 26. The strength of the radio signal should be sufficient to reach a receiver no more than 100 meters distant.

The third transceiver 60 receives the radio frequency signal generated by the first transceiver 20 through the third antenna 66. A third computer chip or circuit 64 converts the radio frequency signal received by the third receiver 60 as a haptic signal (vibration) which is felt by an individual in close proximity to the third receiver 60.

The third transceiver 60 may generate a variety of haptic signals to permit the individual in close proximity to the third receiver 60 to determine which of the first transceiver 20 or the second transceiver 40 is transmitting the signal indicating that a specific sound corresponding to, for example a telephone ringing, and some action by the individual may be required. The haptic signal may be coded such as by the frequency or number of vibrations.

The third transceiver 60 may also visually display on the third visual display 68 a message indicating the source of the transmission from the first transceiver 20. The mode where a visual message is displayed on the third visual display 68 displayed this is aware the individual is hearing impaired in the situation where the haptic signal is the sole signal given this mode is particularly useful for the visually impaired.

The third transceiver 60 may communicate with the first transceiver 20 to the third transceiver microphone 60, such as when utilized by a visually-impaired person or by a hearing-impaired person with sufficient speaking ability to alert a third party in proximity to the first transceiver 20 that the third transceiver 60 has received a communication from the first transceiver 20. The first transceiver 20 may provide this communication audibly through the first speaker 30. It is also possible to utilize the on off switch 300 to deliver a prerecorded message to the first transceiver 20. In the foregoing manner, a hearing person may receive a message that a hearing-impaired person desires to receive a communication from the hearing person. Similarly, a visually impaired person may require additional time to; for example, answer the door of a home. The visually impaired person thus may from a distance alert the person who initiated contact with the first transceiver that the communication has been received at the third transceiver by the visually impaired person.

What is claimed is:

1. A system to aid in communicating with the hearing impaired comprising:

a first transceiver capable of being trained to recognize a first audible event by microphone;

the said first transceiver having means to convert such first audible event to a radio frequency signal;

a second transceiver capable of being trained to recognize a second different audible event by microphone;

the said second transceiver having means to convert such second different audible event to a second radio frequency signal;

a third transceiver capable of radio frequency communication with the said first transceiver and the said second transceiver;

the said third transceiver having haptic means to alert an individual in close proximity to the said third transceiver that a message corresponding to the first audible event has occurred because of receipt of the first radio frequency signal by the said third transceiver or that the second different audible event has occurred because of receipt of the second radio frequency signal by the said third transceiver;

the said third transceiver having means to visually communicate a message corresponding to the detection of the first audible event or the different second audible event when said third transceiver has received by said third transceiver from at least one of said first transceiver or said second transceiver; provided further that the first audible event is entered into a computer chip or circuit in said first transceiver as a first specific radio frequency signal and the said third transceiver is programmed to receive only said first specific radio frequency signal.

2. The system according to claim 1 to aid in communicating with the hearing impaired wherein the said first specific radio frequency signal is converted by the said third transceiver to a coded haptic message.

3. The system according to claim 1 to aid in communicating with the hearing impaired wherein the said first specific radio frequency signal is converted by the said third transceiver to a visual message.

4. The system according to claim 1 wherein the said third transceiver has means to communicate a message to the region proximate to the first transceiver or the second transceiver that a communication has been received by the third transceiver.

5. A system to aid in communicating with an impaired person comprising:

a first transceiver capable of being trained to recognize a first audible event by microphone;

the said first transceiver having means to convert such first audible event to a radio frequency signal;

a second transceiver capable of being trained to recognize a second different audible event by microphone;

the said second transceiver having means to convert such second different audible event to a second radio frequency signal;

a third transceiver capable of radio frequency communication with the said first transceiver and the said second transceiver;

the said third transceiver having haptic means to alert an individual in close proximity to the said third transceiver that a message corresponding to the first audible event has occurred because of receipt of the first radio frequency signal by the said third transceiver or that the second different audible event has occurred because of receipt of the second radio frequency signal by the said third transceiver;

the said third transceiver having means to audibly communicate a message corresponding to the detection of the first audible event or the different second audible event when said third transceiver has received by said third transceiver from at least one of said first transceiver or said second transceiver; provided further that the first audible event is entered into a computer chip or circuit in said first transceiver as a first specific radio frequency signal and the said third transceiver is programmed to receive only said first specific radio frequency signal.

6. The system according to claim 5 to aid in communicating with the visually impaired wherein the said first specific radio frequency signal is converted by the said third transceiver to a coded haptic message.

7. The system according to claim 5 to aid in communicating with the visually impaired wherein the said first specific radio frequency signal is converted by the said third transceiver to an audible message.

8. The system according to claim 5 to aid in communicating with the visually impaired wherein the said third transceiver has means to communicate a message to the region proximate to the first transceiver or the second transceiver that a communication has been received by the third transceiver.

9. A method to aid in communicating with an impaired person comprising obtaining:

a first transceiver capable of being trained to recognize a first audible event by microphone;

the said first transceiver having means to convert such first audible event to a radio frequency signal;

a second transceiver capable of being trained to recognize a second different audible event by microphone;

the said second transceiver having means to convert such second different audible event to a second radio frequency signal;

a third transceiver capable of radio frequency communication with the said first transceiver and the said second transceiver;

the said third transceiver having haptic means to alert an individual in close proximity to the said third transceiver that a message corresponding to the first audible event has occurred because of receipt of the first radio frequency signal by the said third transceiver or that the second different audible event has occurred because of receipt of the second radio frequency signal by the said third transceiver;

the said third transceiver having means to communicate a message corresponding to the detection of the first audible event or the different second audible event when the said third transceiver has received by the said third transceiver from at least one of the said first transceiver or the said second transceiver; provided further that the first audible event is entered into a computer chip or circuit in said first transceiver as a first specific radio frequency signal and the said third transceiver is programmed to receive only said first specific radio frequency signal.

* * * * *